(12) United States Patent
Schultz

(10) Patent No.: US 8,689,759 B2
(45) Date of Patent: Apr. 8, 2014

(54) DUAL DRIVE PUMP SYSTEM USING AN ENGINE STARTER MOTOR

(75) Inventor: John C. Schultz, Saline, MI (US)

(73) Assignee: GM Global Technology Operations LLC, Detroit, MI (US)

(*) Notice: Subject to any disclaimer, the term of this patent is extended or adjusted under 35 U.S.C. 154(b) by 289 days.

(21) Appl. No.: 13/165,119

(22) Filed: Jun. 21, 2011

(65) Prior Publication Data

US 2012/0080003 A1 Apr. 5, 2012

Related U.S. Application Data

(60) Provisional application No. 61/388,887, filed on Oct. 1, 2010.

(51) Int. Cl.
*F02N 15/00* (2006.01)

(52) U.S. Cl.
USPC .................................................. 123/179.31

(58) Field of Classification Search
USPC ............ 123/179.25, 179.31, 198 C; 417/319, 417/326, 350, 429
See application file for complete search history.

(56) References Cited

U.S. PATENT DOCUMENTS

| | | | | |
|---|---|---|---|---|
| 3,590,658 A | * | 7/1971 | Tuck | 475/24 |
| 5,474,428 A | * | 12/1995 | Kimura et al. | 417/16 |
| 6,575,865 B2 | * | 6/2003 | Takenaka et al. | 475/5 |
| 6,656,083 B2 | * | 12/2003 | Esaki | 477/5 |
| 6,860,726 B2 | * | 3/2005 | Carter, III et al. | 417/319 |
| 6,964,631 B2 | | 11/2005 | Moses et al. | |
| 7,128,677 B2 | * | 10/2006 | Supina et al. | 475/5 |
| 8,317,652 B2 | * | 11/2012 | Hladun et al. | 477/5 |
| 8,430,190 B2 | * | 4/2013 | Honda et al. | 180/65.25 |
| 2012/0082570 A1 | * | 4/2012 | Schultz | 417/212 |
| 2012/0118102 A1 | * | 5/2012 | Schultz | 74/665 B |

FOREIGN PATENT DOCUMENTS

| | | | | |
|---|---|---|---|---|
| WO | WO 2009/128288 | * | 1/2009 | B60K 6/36 |
| WO | WO 2012/090019 | * | 7/2012 | B60K 17/28 |

* cited by examiner

*Primary Examiner* — Hai Huynh

(57) ABSTRACT

A dual drive pump system for rear wheel or front wheel drive automatic transmission in a motor vehicle includes a dual drive pump disposed off-axis of the transmission input shaft axis and driven by a gear train driven by a hub. The dual drive pump is also driven by a gear train driven by an engine starter motor. Torque multiplication through the gear train allows the dual drive pump to have a smaller displacement while still providing the hydraulic pressure needs of the transmission. The dual drive pump may be driven by either an engine or the engine starter motor depending on the operating conditions of the motor vehicle.

20 Claims, 3 Drawing Sheets

DUAL DRIVE PUMP SYSTEM USING AN ENGINE STARTER MOTOR

CROSS-REFERENCE TO RELATED APPLICATIONS

This application claims the benefit of U.S. Provisional Application No. 61/388,887 filed on Oct. 1, 2010. The disclosure of the above application is incorporated herein by reference.

FIELD

The present disclosure relates to a dual drive hydraulic pump for an automatic transmission and more particularly to an off-axis transmission pump that is selectively powered by two prime movers, one of which is an engine starter motor, to allow engine stop-start and hot engine idle starts.

BACKGROUND

The statements in this section merely provide background information related to the present disclosure and may or may not constitute prior art.

Hydraulic motor vehicle transmissions, that is, automatic transmissions for passenger cars and light duty trucks having a plurality of gear assemblies controlled by clutches and brakes, generally include a dedicated hydraulic pump, which provides pressurized transmission (hydraulic) fluid to control valves and actuators. These control valves and actuators engage the clutches and brakes and provide the various gear ratios or speeds.

Such dedicated pumps are generally fixed displacement pumps such as vane or gear pumps that are driven at engine speed from the hub of the torque converter or other startup device located between the engine and the transmission. Such pumps have many design goals. Since the pump is constantly driven at engine speed, it is desirable that it have high efficiency. Additionally, since the pump is most frequently mounted concentric to the engine axis, small size, particularly axial length, is desirable in order not to increase the length of the transmission.

In vehicles having engine stop-start where the engine shuts down during stops in order to increase fuel economy, the pump must be operable to prime or position the clutches and/or brakes by keeping the clutch hydraulic circuits filled with low pressure hydraulic fluid. Various solutions have been proposed to allow the pump to prime the hydraulic circuit during an engine stop-start, such as using auxiliary pumps or accumulators. However, typical designs sacrifice packaging, energy consumption, noise pollution, cost and/or complexity to achieve their goals. Accordingly, there is room in the art for a transmission pump system that has efficient packaging while having reduced complexity and energy costs while still providing adequate engine stop-start performance in terms of energy usage and noise.

SUMMARY

In one example of the principles of the present invention, a dual drive pump system for an automatic transmission is provided. The dual drive pump system includes a dual drive pump disposed off-axis of the transmission input shaft axis and driven by a gear train driven by a hub. The dual drive pump is also driven by a gear train driven by an engine starter motor. Torque multiplication through the gear train allows the dual drive pump to have a smaller displacement while still providing the hydraulic pressure needs of the transmission. The dual drive pump may be driven by either an engine or the engine starter motor depending on the operating conditions of the motor vehicle.

In another example of the present invention, a powertrain for a vehicle includes a first prime mover having a first drive shaft coupled for rotation with the first prime mover, a second prime mover having a second drive shaft coupled for rotation with the second prime mover, and a hydraulic pump. The second drive shaft is parallel with and offset from the first drive shaft. The hydraulic pump includes a rotor that defines an axis of rotation that is parallel with and spaced apart from the first drive shaft and the second drive shaft. The rotor is connectable for common rotation with each of the first drive shaft and the second drive shaft for providing torque to the rotor from at least one of the first prime mover and the second prime mover.

In another example of the present invention, the powertrain further includes a first gear set including a first gear disposed on the first drive shaft and a second gear connected for rotation with the rotor of the hydraulic pump and meshed with the first gear.

In yet another example of the present invention, the powertrain further includes a first one-way clutch connected between the first drive shaft and the first gear of the first gear set for allowing relative rotation between the rotor of the pump and the first drive shaft when second prime mover is driving the rotor and for transferring torque from the first drive shaft to the first gear set and the rotor when the first prime mover is driving the rotor.

In yet another example of the present invention, the powertrain further includes a second gear set including a first gear meshed with a second gear that is meshed with a third gear. The first gear is connectable for rotation with the rotor of the hydraulic pump, the second gear is disposed on an idler shaft, and the third gear is disposed on the second drive shaft.

In yet another example of the present invention, the powertrain further includes a second one-way clutch connected between the first gear of the second gear set and the rotor of the hydraulic pump for transferring torque from the second drive shaft to the rotor when the second prime mover is driving the rotor and for allowing free rotation between the rotor and the second drive shaft when the first prime mover is driving the rotor.

In yet another example of the present invention, second gear set provides a torque ratio of greater than about 4:1 between the second prime mover and the rotor of the pump.

In yet another example of the present invention, the first prime mover is a combustion engine.

In yet another example of the present invention, the second prime mover is an electric motor.

In yet another example of the present invention, the electric motor is a starter motor connectable for common rotation with the combustion engine to provide a starting torque to the engine.

In yet another example of the present invention, the starter motor includes a low duty mode for driving the rotor of the pump and includes a high duty mode for providing the starting torque to the engine.

In yet another example of the present invention the starter motor further includes a solenoid and a starter gear connected for common rotation with the rotor of the pump. Selective engagement of the solenoid couples the starter gear with a flex plate connected to the engine.

In yet another example of the present invention, the first and second gear sets are disposed inside a housing of a transmission, the starter motor and pump are disposed inside a bellhousing, and the first drive shaft is coaxial with an input shaft of the transmission.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
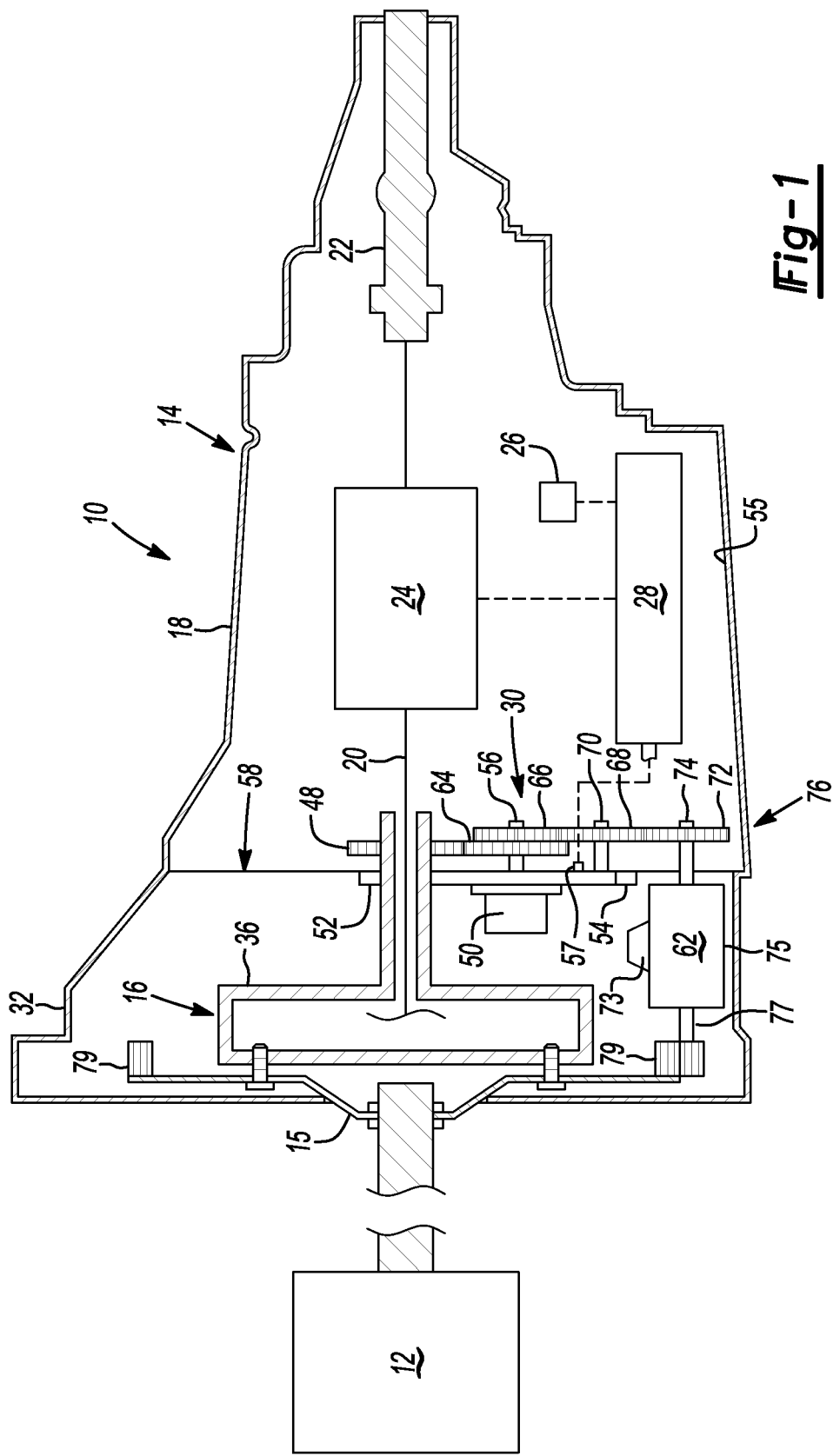
FIG. 1 is a schematic view of an exemplary powertrain of a motor vehicle according to the principles of the present invention.

With reference to FIG. 1, an exemplary powertrain for a motor vehicle is generally indicated by reference number 10. The powertrain 10 includes an engine 12 interconnected to a transmission 14. The engine 12 may be a conventional internal combustion engine or an electric engine, or any other type of prime mover without departing from the scope of the present disclosure. The engine 12 supplies a driving torque to the transmission 14 through a flexplate 15 or other connecting device that is connected to a starting device 16. The starter device 16 may be a hydrodynamic device, such as a fluid coupling or torque converter, a wet dual clutch, or an electric motor. It should be appreciated that any starting device 16 between the engine 12 and the transmission 14 may be employed.

The transmission 14 includes a typically cast, metal housing 18 which encloses and protects the various components of the transmission 14. The housing 18 includes a variety of apertures, passageways, shoulders and flanges which position and support these components. Generally speaking, the transmission 14 includes a transmission input shaft 20 and a transmission output shaft 22. Disposed between the transmission input shaft 20 and the transmission output shaft 22 is a gear and clutch arrangement 24. It should be appreciated that while the transmission 14 is illustrated as a rear wheel drive transmission, the transmission 14 may be a front wheel drive transmission without departing from the scope of the present disclosure. The transmission input shaft 20 is functionally interconnected with the engine 12 via the starting device 16 and receives input torque or power from the engine 12. Accordingly, the transmission input shaft 20 may be a turbine shaft in the case where the starting device 16 is a hydrodynamic device, dual input shafts where the starting device 16 is a dual clutch, or a drive shaft where the starting device 16 is an electric motor. The transmission output shaft 22 is preferably connected with a final drive unit (not shown) which may include, for example, propshafts, differential assemblies, and drive axles. The transmission input shaft 20 is coupled to and provides drive torque to the gear and clutch arrangement 24.

The gear and clutch arrangement 24 includes a plurality of gear sets, a plurality of clutches and/or brakes, and a plurality of shafts. The plurality of gear sets may include individual intermeshing gears, such as planetary gear sets, that are connected to or selectively connectable to the plurality of shafts through the selective actuation of the plurality of clutches/brakes. The plurality of shafts may include layshafts or countershafts, sleeve and center shafts, reverse or idle shafts, or combinations thereof. The clutches/brakes are selectively engageable to initiate at least one of a plurality of gear or speed ratios by selectively coupling individual gears within the plurality of gear sets to the plurality of shafts. It should be appreciated that the specific arrangement and number of the gear sets, clutches/brakes, and shafts within the transmission 14 may vary without departing from the scope of the present disclosure.

The transmission 14 also includes a transmission control module 26. The transmission control module 26 is preferably an electronic control device having a preprogrammed digital computer or processor, control logic, memory used to store data, and at least one I/O peripheral. The control logic includes a plurality of logic routines for monitoring, manipulating, and generating data. The transmission control module 26 controls the actuation of the clutches/brakes via a hydraulic control system 28. The hydraulic control system 28 is operable to selectively engage the clutches/brakes by selectively communicating a hydraulic fluid to the clutches/brakes that engages the clutches/brakes. The hydraulic fluid is communicated to the clutches/brakes under pressure from a dual pump system 30 connected to the hydraulic control system 28, as will be described in greater detail below.

The starting device 16 is housed within a bell housing 32. The bell housing 32 is generally cast aluminum and includes openings, counterbores, flanges, shoulders and other features which receive, locate and support the various components of the starting device 16 as well as the dual pump system 30. Generally speaking, the starting device 16 includes a hub, shell, or other member 36 that is directly driven by the engine 12 via the flexplate connection 15 or other type of connection. The hub 36 extends through the bell housing 32 and into the transmission housing 18. A first drive gear 48 is fixedly connected to the hub 36 by any suitable means such as, for example, complementary flats, interengaging splines, one or more drive pins or set screws, a friction fit or a combination of any of these elements.

Figure 2:
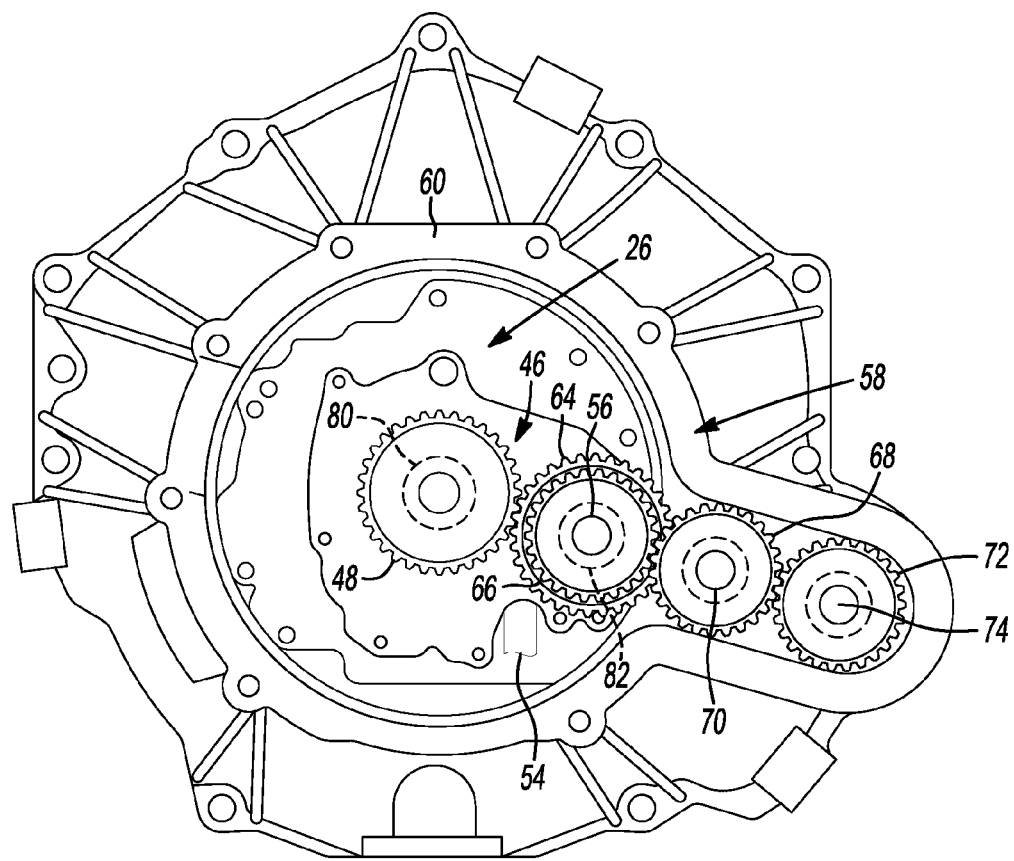
FIG. 2 is an end view of an exemplary bell housing according to the principles of the present invention.

With combined reference to FIGS. 1 and 2, the pump system 30 of the transmission 14 includes an off-axis pump 50. The pump 50 is mounted in a support plate 52 which typically includes a fluid inlet or suction passageway 54 for the pump 50 that communicates with a sump 55 in the transmission 14 and an outlet port 57 that communicates with various components in the transmission 14 including the hydraulic control system 28. As illustrated in FIG. 2, the suction passageway 54 is disposed more proximate the center of the bell housing 32, improving porting and further enhancing the mounting flexibility of the pump 50. The support plate 52, and therefore the pump 50, is mounted on an inside of the bell housing 32. The pump 50 includes a drive shaft or input shaft 56 that extends through the bell housing 32 to a transmission side 58 of the bell housing 32. The transmission side 58 includes a connector flange 60, best seen in FIG. 2, that circumnavigates the components of the pump system 30 located on the transmission side 58. The connector flange 60 is configured to mate with the transmission housing 18 so that starting device 16 is essentially a modular unit.

Figure 3:
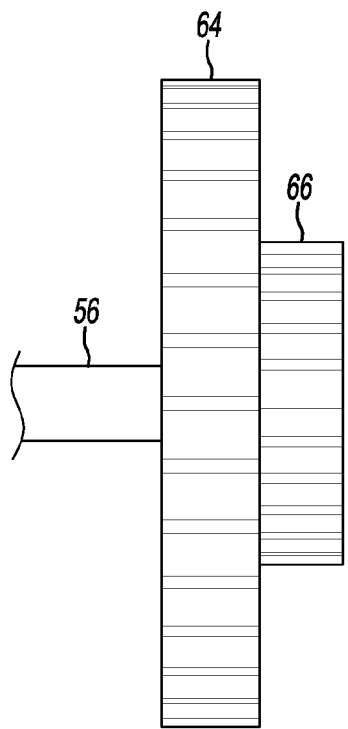
FIG. 3 is a side view of an embodiment of a pump gear set according to the principles of the present invention.

The pump 50 is driven by two prime movers including the engine 12 via the hub 36 and by a second prime mover or engine starter motor 62. In the example provided, the pump 50 includes a first and second driven gear 64, 66 rotationally fixedly connected to the pump input shaft 56, as best seen in FIGS. 2 and 3. The first driven gear 64 is in mesh with and is selectively driven by the first drive gear 48. The second driven gear 66 is in mesh with an idler gear 68. The idler gear 68 is a free-wheeling gear mounted on a support or idler shaft 70. The idler gear 68 is also in mesh with a second drive gear 72. The second drive gear 72 is rotationally, fixedly mounted to an output shaft 74 of the engine starter motor 62.

The engine starter motor 62 is preferably mounted within the bell housing 32 and includes an activation solenoid 73 and an electric motor 75. A pinion shaft 77 extends out from a first side of the starter motor 62 and is slidably engageable with a gear 79 connected with the flexplate 15 in order to crank the engine 12 during engine start. The output shaft 74 extends from an opposite side of the starter motor 62 and extends through the bell housing 32 to the transmission side 58. Both the pinion shaft 77 and the output shaft 74 are rotationally driven by the electric motor 75. However, the pinion shaft 77 only engages the gear 79 of the flexplate 15 when the solenoid 73 is activated, thereby extending the pinion shaft 77 to engage the gear 79 of the flexplate 15. The engine starter motor 62 includes at least two separate operating modes including a high duty cycle starter mode configured to crank the engine 12 when the solenoid is activated and the pinion shaft 77 is in mesh with the gear 79 of the flexplate 15, and a low duty cycle mode configured to drive the pump 50 through the output shaft 74 when the solenoid is deactivated, as will be described in greater detail below.

By mounting the gears 48, 64, 66, 68, and 72 on the transmission side 58, the gears 48, 64, 66, 68, and 72 benefit from a wet environment (i.e. oiled). Alternatively, the pump system 30 may be longitudinally reversed such that the gear train 76 may be located in the bell housing 32 while the pump 50 and the engine starter motor 56 may be located on the transmission side 58.

Accordingly, the pump 50 is driven by a gear train 76 that comprises the first and second drive gears 48, 72, the idler gear 68, and the first and second driven gears 64, 66. Preferably, each of the gears 48, 64, 66, 68, and 72 share a common radial centerline in order to minimize misalignment of the gears train 76 during assembly, thereby reducing gear clash and noise pollution. However, it should be appreciated that the gear train 76 may have off-centerline gears without departing from the scope of the present invention. It should also be understood that the hydraulic pump 50 and the engine starter motor 62 may be disposed proximate the hub 36 at any convenient circumferential location. In addition, each of the gears 48, 64, 66, 68, and 72 are preferably involute spline gears which are tolerant of misalignment. This is especially helpful during bending of the transmission 14 during turning of the motor vehicle. However, it should be appreciated that other types of gears may be employed without departing from the scope of the present invention. The gears 48, 64, 66, 68, and 72 may be made from any suitable material, such as powdered metal or plastic, without departing from the scope of the present invention.

The diameter and tooth count of each of the gears 48, 64, 66, 68, and 72 may vary and is a function of the type pump 50 and engine starter motor 62 employed, as well as other factors relating to the hydraulic needs of the transmission 14. For example, in a one embodiment, the pump 50 is a 7 cc/rev to 10 cc/rev positive displacement pump, such as a vane pump, gear pump or gerotor pump. The engine starter motor 62 is preferably a small, high speed electric motor. Therefore, the gear train 76 is configured through gear diameter and tooth count to multiply torque from the engine starter motor 62 to the pump 50 at about 4:1 or 5:1. To improve slow speed operation and priming, the first drive gear 48 may have a diameter larger than the diameter of the first driven gear 64, thereby increasing the relative rotational speed of the pump 50. As those familiar with gear train assemblies will readily understand, if it is desired that the hydraulic pump 50 rotate more slowly than the hub 36, the larger and smaller diameter drive members need only be interchanged.

Figure 4:
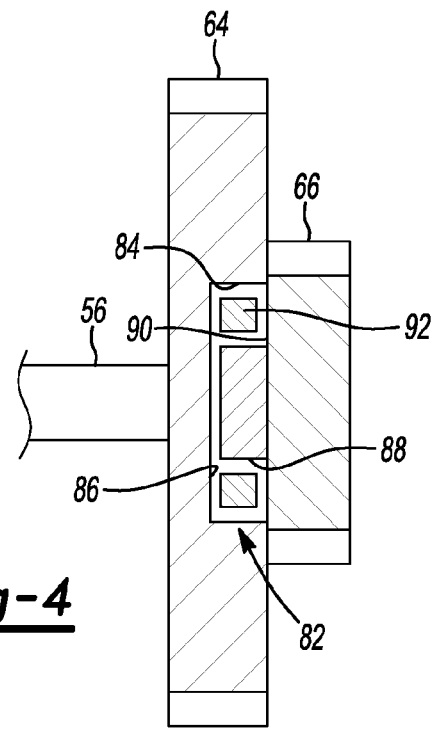
FIG. 4 is a partial cross-sectional view of an embodiment of a pump gear set having an integrated one-way clutch according to the principles of the present invention.

In order to minimize drag on the pump system 30, the gear train 76 preferably includes two one-way clutches or one selectively actuated two-way clutch. Various configurations may be employed, however, the purpose of the one way clutches is to allow whichever of the drive gears 48 and 72 is running slower than the other to freewheel, thereby preventing drag on the pump 50. For example, the gear train 76 includes a first one-way clutch 80 and a second one-way clutch 82. The one-way clutches 80, 82 may be of any type, such as roller clutches, sprag clutches, or diode clutches, without departing from the scope of the present invention. In the example provided, the first one-way clutch 80 is connected between the pump hub 40 and the first drive gear 48. The first one-way clutch 80 is configured to allow the first drive gear 48 to freewheel in a rotational direction relative to the hub 36 when the engine starter pump 62 is driving the pump 50. The second one-way clutch 82 is connected between the drive shaft 56 and the second driven gear 66. The second one-way clutch 82 is configured to allow the second driven gear 66 to freewheel in a rotational direction relative to the pump drive shaft 56 when the engine 12 is driving the pump 50. Turning to FIG. 4, an example of the second one-way clutch 82 integrated with the first and second driven gears 64 and 66 is illustrated. In the example provided, the one-way clutch 82 is a roller one-way clutch. An outer race 84 of the one-way clutch 82 is configured on an inside surface 86 of the first driven gear 64. An inner race 88 is configured on an outside surface 90 of the second driven gear 66. Rollers or sprag elements 92 are located between the inner and outer races 84, 88. Biasing members (not shown) and ramps (not shown) may be integrated with the inner and outer races 84 and 88, respectively.

Figure 5:
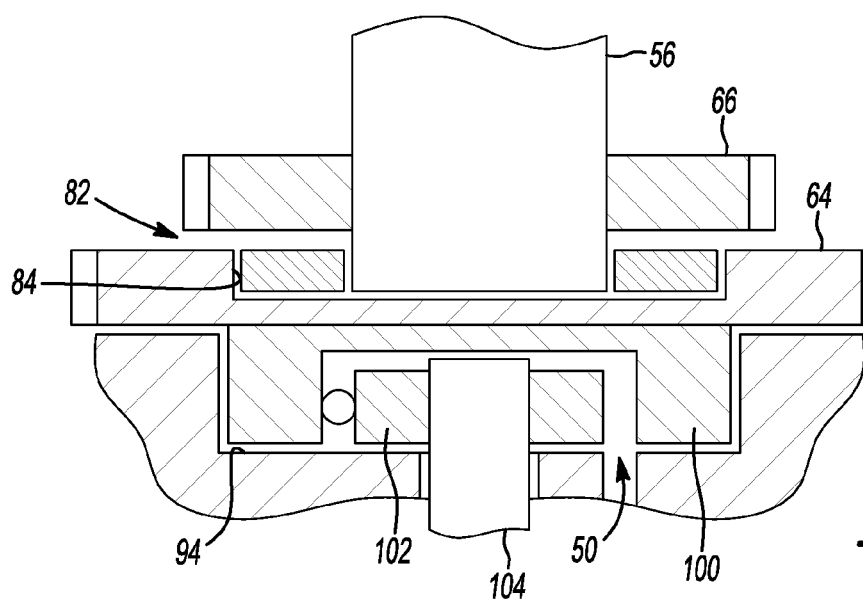
FIG. 5 is a partial cross-sectional view of a gear pump with an integrated one-way clutch according to the principles of the present invention.

With reference to FIG. 5, in an alternate embodiment, the one-way clutch 82 is shown integrated with the pump 50 where the pump 50 is a gerotor pump. The pump 50 is preferably located within a pocket 94 located within the bell housing 32. The pump 50 includes an outer drive member 100 and an inner driven member 102. The drive member 100 is rotationally fixed to the first driven gear 64 and rotationally coupled through the one-way clutch 82 to the drive shaft 56 and therefore the second driven gear 66. The inner drive member 102 is freely rotatable on a support shaft 104. Similar to the embodiment shown in FIG. 4, the one-way clutch 82 has inner and outer races that are formed on surfaces of the first driven gear 64 and, in the example provided, the pump input shaft 56. However, it should be appreciated that the one-way clutches 80 and 82 may be separately configured from the components of the pump system 30 without departing from the scope of the present invention.

With combined reference to FIGS. 1 and 2, during normal operation of the powertrain 10, the pump 50 may be operated as a single drive pump wherein only one of the prime movers is powering the pump 50 at a given time, or as a dual drive pump wherein one prime mover is used to augment the other prime mover during certain operating conditions. For example, during normal operating conditions with the engine 12 operating at approximately 1000 RPM (a highway duty cycle), the engine 12 drives the pump 50 through the hub 36 of the starting device 16, through the first drive gear 48 to the first driven gear 64, and from the first driven gear 64 to the drive shaft 56. However, during conditions where the engine 12 is operating at a lower duty cycle, such as at 500 RPM during a hot, idle garage shift, the engine starter motor 62 is used to power the pump 50 through the second drive gear 72, through the idler gear 68 and the second driven gear 66, to the drive shaft 56. In this condition, the engine starter motor 62 is not needed to start the engine and the pinion shaft 77 is not engaged with the flywheel 15. The pump 50 sized for mechanical drive from the engine at 1000 RPM at normal operating temperature could be half the displacement of a pump sized for mechanical drive from the engine for a hot idle garage shift at 500 rpm. Accordingly, the pump 50 may be reduced in size, therefore increasing fuel economy.

During operation of the powertrain 10, the motor vehicle will occasionally enter engine stop-start conditions. Engine stop-start occurs when the motor vehicle has temporarily stopped during operation, such as at a traffic light, stop sign, or due to traffic or other temporary conditions. During an engine stop-start, the engine 12 shuts down to increase fuel economy. However, it is important that the clutches/brakes within the transmission 14 remain primed (i.e. hydraulically actuated to an engaged position) with low pressure hydraulic fluid in order to allow swift and noiseless gear engagement when the engine 12 starts. Accordingly, during a stop-start, when the engine 12 is off, the engine starter motor 62 is engaged at a low duty cycle to drive the pump 50 in order to keep the clutch circuits filled. As the engine 12 starts during vehicle take-off, solenoid 73 is engaged and the engine starter motor 62 ramps up to a higher duty cycle (e.g. 4000 RPM) in order to fully engage the appropriate clutches/brakes and to crank the engine 12. The engine 12 restart masks the noise of the engine starter motor 62. Once the engine 12 has reached a normal duty cycle, the engine starter motor 62 is disengaged and the engine 12 continues to drive the pump 50.

The construction and configuration of the hydraulic pump 50 provides high pumping efficiency. Such efficiency is the result of several aspects of the pump 50 of the present invention. First of all, in its preferred configuration and disposition, it is mounted off-axis in a transmission. The overall smaller pump diameter and component size of an off-axis pump reduces rotational and sliding friction, reduces rotating internal leakage and permits tighter tolerances, all factors which improve operating efficiency. In addition, an off-axis design facilitates other drive arrangements such as by a dedicated electric motor which has the additional capability of driving the pump when the engine is not running in, for example, engine start-stop (ESS) applications.

The off-axis design of the pump-system 30 allows a rotational speed increase or decrease relative to the rotational speed of the engine 12 and the engine starter motor 62. This is useful because the typical limiting (minimum) pump flow occurs at low RPM, such as engine idle speed, and it may be desirable to increase this speed such that pump flow is greater at low engine speeds.

The description of the invention is merely exemplary in nature and variations that do not depart from the gist of the invention are intended to be within the scope of the invention. Such variations are not to be regarded as a departure from the spirit and scope of the invention.

The invention claimed is:

1. A powertrain for a vehicle, the powertrain comprising:
a first prime mover having a first drive shaft coupled for rotation with the first prime mover;
a second prime mover having a second drive shaft coupled for rotation with the second prime mover, wherein the second drive shaft is parallel with and offset from the first drive shaft; and
a hydraulic pump including a rotor that defines an axis of rotation that is parallel with and spaced apart from the first drive shaft and the second drive shaft, wherein the rotor is selectively interconnected with each of the first drive shaft and the second drive shaft for transferring torque between the rotor and at least one of the first prime mover and the second prime mover.

2. The powertrain of claim 1 further including a first gear set including a first gear disposed on the first drive shaft and a second gear connected for rotation with the rotor of the hydraulic pump and meshed with the first gear.

3. The powertrain of claim 2 further including a first one-way clutch connected between the first drive shaft and the first gear of the first gear set for allowing relative rotation between the rotor of the pump and the first drive shaft when second prime mover is driving the rotor and for transferring torque from the first drive shaft to the first gear set and the rotor when the first prime mover is driving the rotor.

4. The powertrain of claim 3 further including a second gear set including a first gear meshed with a second gear that is meshed with a third gear, wherein the first gear is connectable for rotation with the rotor of the hydraulic pump, the second gear is disposed on an idler shaft, and the third gear is disposed on the second drive shaft.

5. The powertrain of claim 4 further including a second one-way clutch connected between the first gear of the second gear set and the rotor of the hydraulic pump for transferring torque from the second drive shaft to the rotor when the second prime mover is driving the rotor and for allowing free rotation between the rotor and the second drive shaft when the first prime mover is driving the rotor.

6. The powertrain of claim 5 wherein the second gear set provides a torque ratio of greater than about 4:1 between the second prime mover and the rotor of the pump.

7. The powertrain of claim 1 wherein the first prime mover is a combustion engine.

8. The powertrain of claim 1 wherein the second prime mover is an electric motor.

9. The powertrain of claim 8 wherein the electric motor is a starter motor connectable for common rotation with the combustion engine to provide a starting torque to the engine.

10. The powertrain of claim 9 wherein the starter motor includes a low duty mode for driving the rotor of the pump and includes a high duty mode for providing the starting torque to the engine.

11. The powertrain of claim 9 wherein the starter motor further includes a solenoid and a starter gear connected for common rotation with the rotor of the pump, wherein selective engagement of the solenoid couples the starter gear with a flex plate connected to the engine.

12. The powertrain of claim 9 wherein the first and second gear sets are disposed inside a housing of a transmission, the starter motor and pump are disposed inside a bellhousing, and the first drive shaft is coaxial with an input shaft of the transmission.

13. A powertrain for a vehicle, the power train comprising:
an engine;
a transmission including a transmission input shaft;
a first drive shaft driven by the engine and coaxial with the input shaft of the transmission;
an electric motor;
a second drive shaft driven by the electric motor, wherein the second drive shaft is parallel with and offset from the first drive shaft;
a hydraulic pump including a rotor coupled for rotation with a rotor shaft that is parallel with and spaced apart from the first drive shaft and the second drive shaft;
a first gear set selectively interconnected between the first drive shaft and the rotor shaft for transferring torque between the engine and the rotor of the pump; and
a second gear set selectively connected between the second drive shaft and the rotor shaft for transferring torque between the electric motor and the rotor of the pump.

14. The powertrain of claim 13 further including a one-way clutch connected between the first drive shaft and the rotor shaft for transferring torque from the engine to the rotor shaft when the engine is rotating the rotor shaft faster than the electric motor is rotating the rotor shaft and for allowing free rotation between the engine and the rotor shaft when the electric motor is rotating the rotor shaft faster than the engine is rotating the rotor shaft.

15. The powertrain of claim 14 further including a second one-way clutch connected between the second drive shaft and the rotor shaft for transferring torque from the electric motor to the rotor shaft when the electric motor is rotating the rotor shaft faster than the engine is rotating the rotor shaft and for allowing free rotation between the electric motor and the rotor shaft when the engine is rotating the rotor shaft faster than the electric motor is rotating the rotor shaft.

16. The powertrain of claim 15 wherein the first gear set includes a first gear disposed on the first drive shaft and a second gear connectable for rotation with the rotor of the hydraulic pump and meshed with the first gear.

17. The powertrain of claim 16 wherein the second gear set includes a first gear meshed with a second gear that is meshed with a third gear, wherein the first gear is connectable for rotation with the rotor shaft of the hydraulic pump, the second gear is disposed on an idler shaft, and the third gear is disposed on the second drive shaft.

18. The powertrain of claim 13 wherein the electric motor is a starter motor connectable for common rotation with the combustion engine to provide a starting torque to the engine.

19. The powertrain of claim 18 wherein the starter motor further includes a solenoid and a starter gear connected for common rotation with the rotor shaft, wherein selective engagement of the solenoid couples the starter gear with a flex plate connected to the engine.

20. A powertrain for a vehicle, the power train comprising:
an engine;
a transmission including a transmission input shaft;
a first drive shaft coupled for rotation with the engine and coaxial with the transmission input shaft;
an electric starter motor selectively engageable with the engine to provide an engine starting torque;
a second drive shaft coupled for rotation with the starter motor, wherein the second drive shaft is parallel with and spaced apart from the first drive shaft;
a hydraulic pump including a rotor coupled for rotation with a rotor shaft that is parallel with and spaced apart from the first drive shaft and the second drive shaft;
a first gear set including a first gear disposed on the first drive shaft and a second gear fixed for common rotation with the rotor shaft for transferring torque from the engine to the rotor of the pump;
a second gear set including a first gear meshed with a second gear that is meshed with a third gear, wherein the first gear is disposed on the rotor shaft, the second gear is disposed on an idler shaft, and the third gear is fixed for common rotation with the second drive shaft for transferring torque from the starter motor to the rotor of the pump;
a first one-way clutch connected between the first drive shaft and the first gear of the first gear set for transferring torque from the engine to the rotor shaft when the engine is driving the rotor shaft and for allowing free rotation between the engine and the rotor shaft when the starter motor is driving the rotor shaft; and
a second one-way clutch connected between the first gear of the second gear set and the second gear of the first gear set for transferring torque from the starter motor to the rotor shaft when the starter motor is driving the rotor shaft and for allowing free rotation between the starter motor and the rotor shaft when the engine is driving the rotor shaft.

* * * * *